July 24, 1956 M. MACCAFERRI 2,755,882
ACOUSTIC TILES
Filed April 22, 1952 4 Sheets-Sheet 1
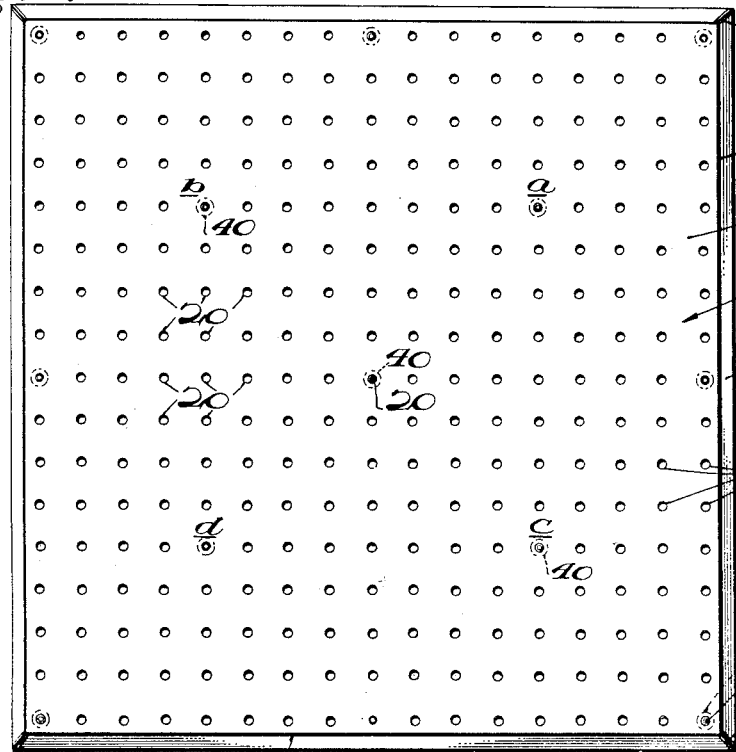
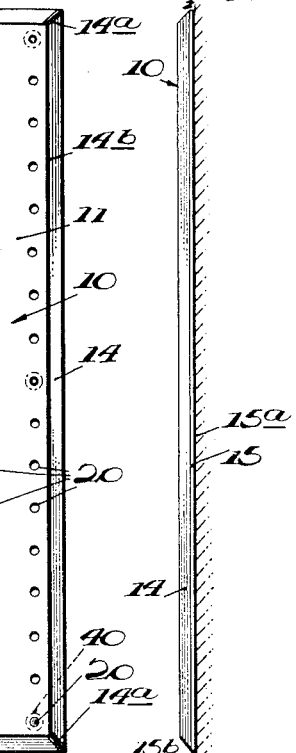
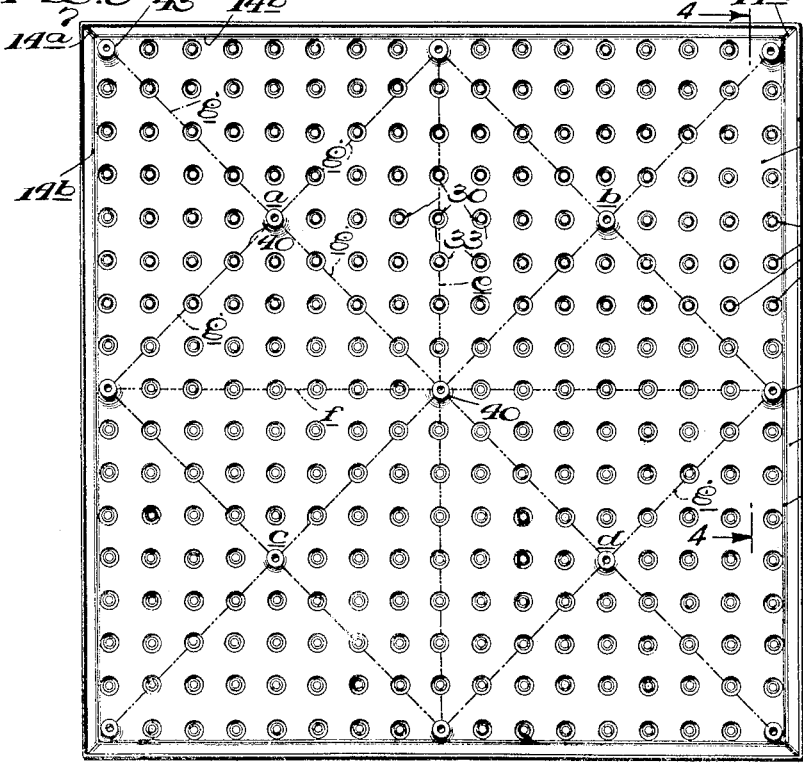
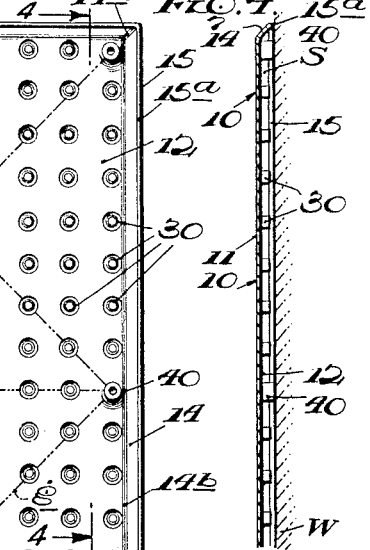
INVENTOR:
Mario Maccaferri
Peck + Peck
ATTORNEYS.

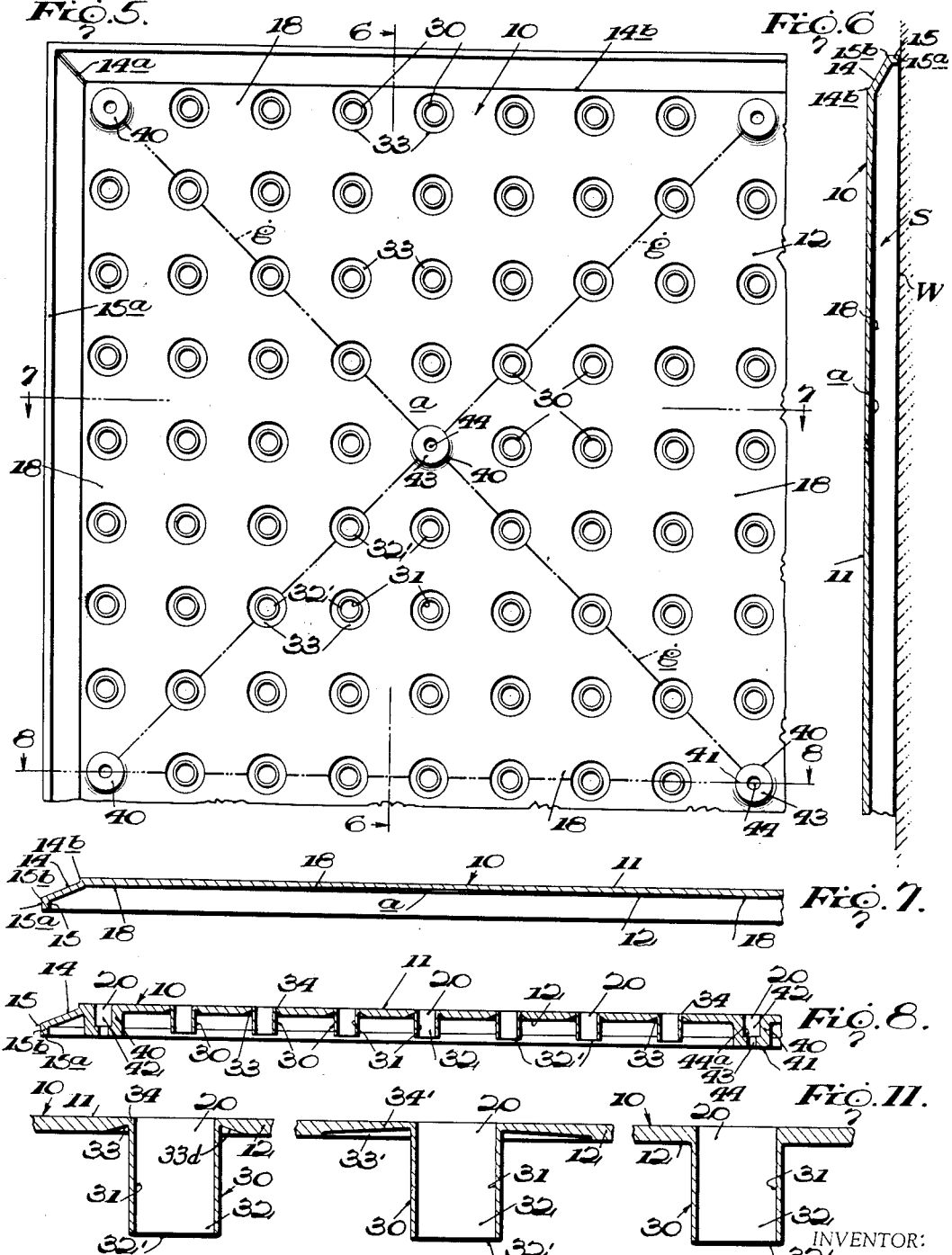

July 24, 1956 — M. MACCAFERRI — 2,755,882
ACOUSTIC TILES
Filed April 22, 1952 — 4 Sheets-Sheet 3
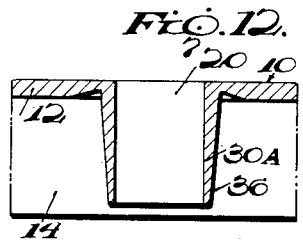
FIG. 12.
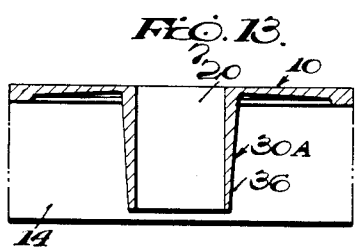
FIG. 13.
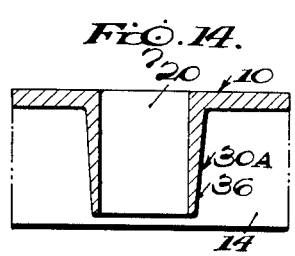
FIG. 14.
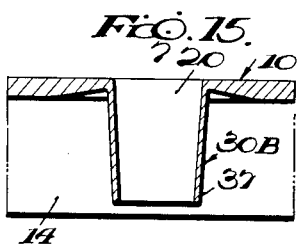
FIG. 15.
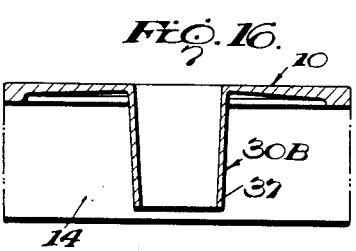
FIG. 16.
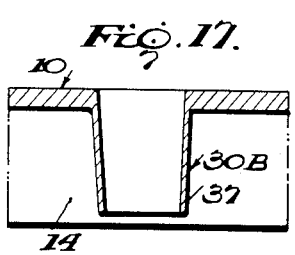
FIG. 17.
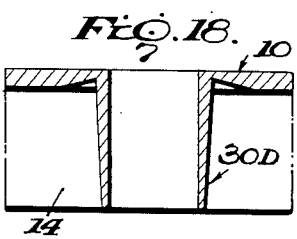
FIG. 18.
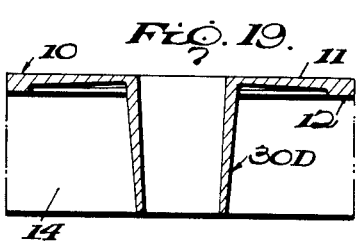
FIG. 19.
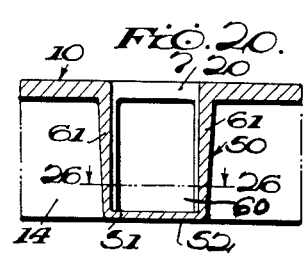
FIG. 20.
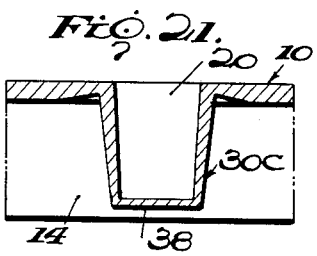
FIG. 21.
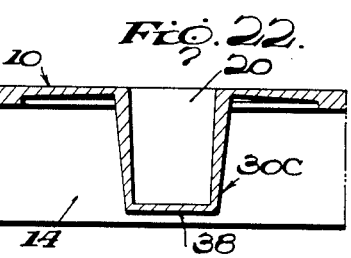
FIG. 22.
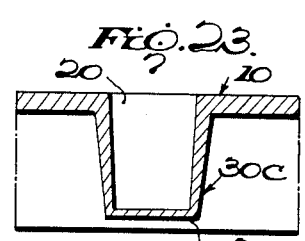
FIG. 23.
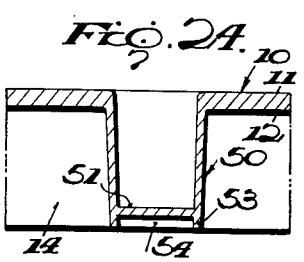
FIG. 24.
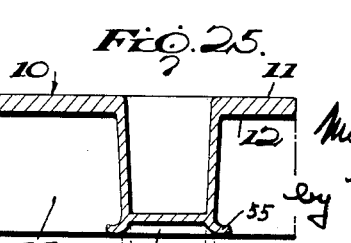
FIG. 25.
FIG. 26.
INVENTOR:
Mario Maccaferri
by Peck & Peck
ATTORNEYS.

July 24, 1956 M. MACCAFERRI 2,755,882
ACOUSTIC TILES
Filed April 22, 1952 4 Sheets-Sheet 4
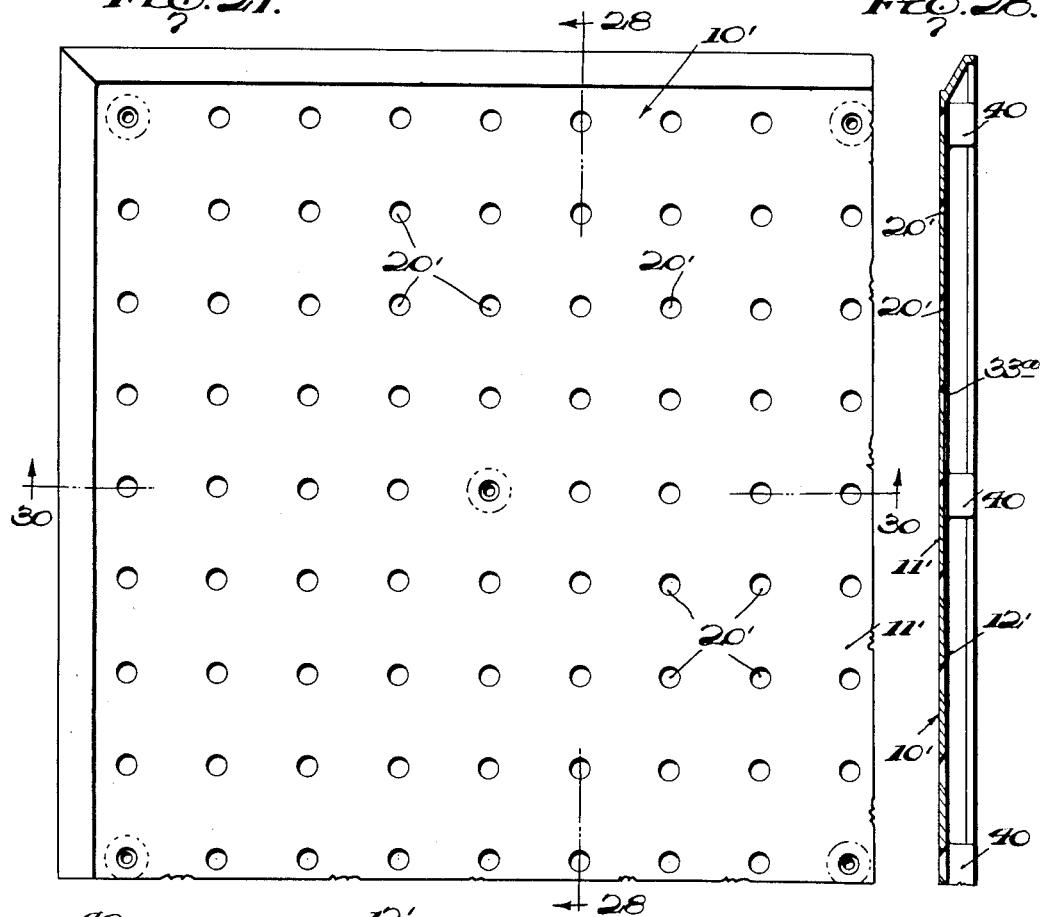
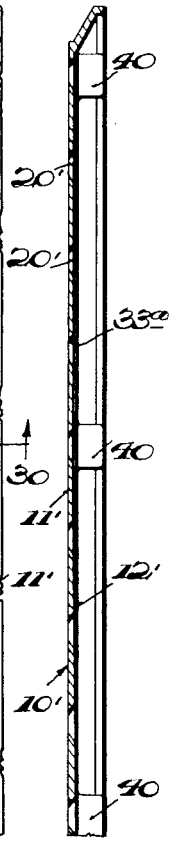
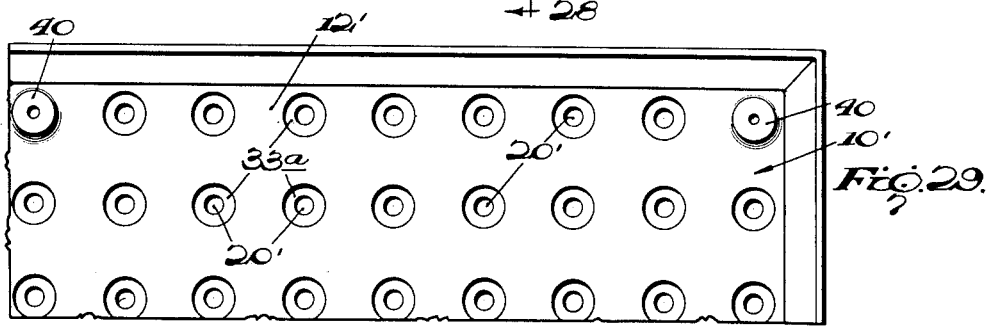
INVENTOR:
Mario Maccaferri
BY Peck & Peck
ATTORNEYS.

United States Patent Office 2,755,882
Patented July 24, 1956

2,755,882

ACOUSTIC TILES

Mario Maccaferri, Rye, N. Y.

Application April 22, 1952, Serial No. 283,707

12 Claims. (Cl. 181—33)

The invention is concerned broadly with the acoustic treatment of wall structures and more specifically is directed to the tile forms of acoustic treatment for application to or to form the sound receiving surfaces for such wall structures; and the nature and objects of the invention will be readily recognized and understood by those skilled in the arts involved in the light of the following explanation and detailed description of the accompanying drawings illustrating what I at present consider to be the preferred embodiments or structural and acoustical expressions of the invention and the various features thereof, from among other forms, expressions, embodiments, modifications, constructions and combinations of which the invention is capable within the broad spirit and scope thereof as defined by the claims hereto appended.

The various types and forms of acoustic tiles which have been proposed by the art fall generally into two broad types or classes, namely, the type in which the tiles are formed of materials which are inherently sound absorptive, and the type in which the tiles are formed of materials which are inherently non-absorptive. Usually in the practical applications of both general types the tiles are formed with openings or passages therein for the passage of sound waves therethrough to space at the rear of the tile in which there is usually placed some form of loose sound absorbing material, either in bulk or in the form of mats or pads. The non-absorptive material tiles usually essentially require both apertures therethrough for sound wave passage and sound absorbing material at the rear of the tile to receive the sound waves, in order to function with any degree of efficiency. Hence, the tile primarily functions as a "pan" or structural covering and carrying element for the added sound absorbing material and contributes acoustically primarily by the openings therein through which the sound energy or waves may reach the sound absorbing material.

The numerous disadvantages of both the sound absorptive and the non-absorptive material tiles are well known to the art and need not here be recited at length. However, specific attention is directed to the fact that with both the sound absorptive and non-absorptive material tiles it is generally impractical and unsatisfactory to coat, as by painting, because of thereby closing or partially blocking the openings or apertures through the tile, so that, it is not practical to color the exposed surfaces of the tiles and the decorative harmonizing of these acoustical tiles and hence the wide application and use thereof, is limited. The cleaning of the exposed surfaces of the tiles is difficult, whether or not coated, because of the apertures and the passage of moisture and foreign matter therethrough with resulting undesirable collections at the rear of the tile on and in the sound absorbing material positioned back of these tiles. Cleaning difficulties are aggravated with the sound absorptive material tiles because of the inherently porous, absorptive characteristics of such materials. As the non-absorptive material tiles are generally formed of metal or such like hard surfaced, dense material, it becomes essential to color the exposed surfaces as by painting, and even if the coating is so applied as to minimize blocking of the tile apertures such coating must be refinished or redone after a certain period of time with the tiles installed.

One of the general objects of my invention is to overcome the color limitations of and the necessity for coating or otherwise finishing and treating the various acoustic tiles of the art before or after installation, by providing acoustic tiles of materials which may have any desired permanent color or color variations and which provide finished surfaces requiring no treatment of any character before or after installation, with the faces or exposed surfaces of the tiles capable of ready cleaning by mere dry wiping or dusting of the exposed surfaces thereof.

In carrying out the above general object, I have provided acoustic tiles of the dense, hard surfaced class formed of materials having no inherent sound absorbing characteristics; and a further important object is to so design and construct such a tile as to cause the body of the tile to itself function to damp out and dissipate a substantial percentage of the sound energy or waves striking against the exposed surface thereof through vibrations of portions of the tile body induced by the striking sound waves.

A further object is to provide such a tile of a construction in which the body of the tile will tend to vibrate at different frequencies over the area thereof when sound waves strike against a surface of the tile body.

Another object is to provide an acoustic tile having vibratory damping tubes projected from the inner side of the tile with sound receiving passages through the tubes opening through the outer, sound wave receiving surface of the tile body.

I have discovered that certain thermoplastic synthetic resins, such as a polystyrene, have when molded the requisite structural and vibratory or resonance response characteristics from which to efficiently form an acoustic tile having the foregoing features in construction and functioning; and a further object is to provide a design and construction for such a thermoplastic acoustic tile which will permit of the tiles being efficiently manufactured on a quantity production basis with standard types of molding equipment at relatively low production costs per tile.

A further object is to provide a thermoplastic material acoustic tile which can be readily and cheaply installed in attached position on a wall or other structure without the use of special tools or equipment by unskilled installers, and with a minimum of tile surface marring and of tile breakage.

Another object is to provide a modified form of the thermoplastic acoustic tile having the sound wave damping and energy dissipating features referred to hereinabove, which will be particularly efficient for those types of installations in which the tiles are to be positioned and secured by manually pressing the tiles into an unset mastic coating applied to the structure to be acoustically treated with the tiles.

A further object is to provide a construction of such a mastic installable tile in which members are provided projected rearwardly from the rear side of the tile with the rear ends of such members formed into suction cups for engagement in the unset mastic onto which the tile is pressed so as to firmly secure the tile in position against displacement during and after setting of the mastic.

Another object is to form a design of such a mastic installable tile in which tubular members project rearwardly from the rear side of the tile with closed rear ends for engagement into the mastic but with the outer ends thereof open through the front exposed surface or face of the tile to function acoustically to absorb and dissipate sound waves striking against the exposed surface or face of the tile.

And a further object is to provide an acoustic tile formed of a thermoplastic synthetic resin capable of being pigmented prior to molding to give to the tile molded therefrom any desired permanent color, shade or color variation, and which aside from permanency of color will produce a tile requiring no further finishing or conditioning after discharge from the mold and prior to installation of the tile.

With the foregoing and various other objects, features and results in view which will be readily apparent from the following description and explanation, my invention consists in certain novel features in design, construction, materials and forms and in combination of elements, all as will be more fully and particularly referred to and described hereinafter.

Referring to the accompanying drawings in which similar reference characters refer to corresponding parts and elements throughout the several figures thereof:

Fig. 1 is a view in plan of the front or exposed side of an acoustic tile of my invention of the form thereof having the multiplicity of freely vibratory sound wave damping tubes projecting from the rear side thereof.

Fig. 2 is a view in edge elevation of the acoustic tile form of Fig. 1.

Fig. 3 is a view in plan of the rear side of the tile of Fig. 1 showing the multiplicity of vibratory tubes thereon and projecting rearwardly therefrom.

Fig. 4 is a partial view in transverse section taken through the tile of Fig. 1, as on the line 4—4 of Fig. 1.

Fig. 5 is an enlarged view in plan of a one-fourth section of the area of the rear side of the tile of Fig. 1.

Fig. 6 is a transverse section taken as on the line 6—6 of Fig. 5, and between the spaced rows of vibratory tubes.

Fig. 7 is a transverse sectional view similar to Fig. 6, but taken as on the line 7—7 of Fig. 5.

Fig. 8 is a transverse sectional view taken as on the line 8—8 of Fig. 5, along a row of the vibratory tubes showing such tubes in longitudinal section.

Fig. 9 is an enlarged fragmentary view in longitudinal section through one of the integral, vibratory tubes and the base construction thereof which joins the tube with the tile, in the form of the tile of Fig. 5.

Fig. 10 is a longitudinal section through a modified construction of the recess formed in the rear side of the tile around the base of the vibratory tube.

Fig. 11 is a longitudinal section of a further modified construction of the tile in which the recess in the rear side of the tile around the base of the tube is eliminated.

Figs. 12, 13 and 14 are sectional views of modifications of the tube forms shown in Figs. 9, 10 and 11, respectively, with the tubes in each instance having the walls thereof of greater thickness and the outer side of each tube wall being tapered longitudinally theerof inwardly to the free end of the tube.

Figs. 15, 16 and 17 are sectional views of further modifications of the forms of the tubes shown in Figs. 9, 10 and 11, respectively, with the tube of each of these modified forms having progressively decreasing internal and external diameters from the base to the rear free end of the tube.

Figs. 18 and 19 are sectional views of further modified forms of the freely vibratory tubes of Figs. 12 and 13, respectively, with each tube being extended inwardly a distance such that the plane passing through the inner edges of the tile edge flange also passes through the inner, open end of the extended tube.

Fig. 20 is a sectional view of a modification of the form of tube as shown in Fig. 14, with this modified form providing diametrically opposite side openings in the tube side wall and an integral closing wall at the inner end of the tube.

Figs. 21, 22 and 23 are still further modified forms of the tubes of Figs. 12, 13 and 14, in which each tube has the rear free end thereof closed by an integral end closing wall.

Fig. 24 is a modified form of the closed end tubes of Figs. 21, 22 and 23, to provide an extension of the tube side wall inwardly beyond the end closing wall to form in effect a suction cup at the inner free end of the tube.

Fig. 25 is a modification of the suction cup form of tube of Fig. 24, to provide an out-turned, annular anchoring flange around the suction cup at the end of the tube.

Fig. 26 is a transverse sectional view through the form of tube shown in Fig. 20, taken as on the line 26—26 of Fig. 20.

Fig. 27 is a view in plan of the exposed front side of a modified form of tile in which the vibratory tube at the rear side of the tile is eliminated with the tile being provided with a multiplicity of sound wave receiving openings therethrough, a fourth of the area of the tile only being shown.

Fig. 28 is a view in transverse section through the portion of the tile of Fig. 27, taken as on the line 28—28 of Fig. 27.

Fig. 29 is a view in plan of a portion of the rear side of the form of the tile of Figs. 27 and 28.

Fig. 30 is a view in transverse section through the form of the tile of Fig. 27, taken as on the line 30—30 of Fig. 27.

Fig. 31 is a fragmentary, detailed view in plan showing the tapered recess surrounding a sound wave receiving recess in the rear side of the tile form of Figs. 27 and 29.

Fig. 32 is a transverse sectional view taken as on the line 32—32 of Fig. 31.

For both the preferred acoustical form of the tile as shown in Figs. 1 through 17, and for the modified form of tile as shown in Figs. 27 through 32, I have selected examples in which the tile is square in plan and has maximum outside dimensions of 12″ by 12″, that is to say, each tile of the selected examples presents approximately one (1) square foot of wall covering when in installed position. A tile of this approximate size is generally considered by the art as a tile adapted primarily for ceiling installation but it is to be understood that with the plastic tile of my present invention due to the design and construction thereof and to the visual appearance of the tile when in installed position, these so-called larger area or "ceiling" tiles may be as readily effectively used, if desired, for installation for the acoustic treatment of side walls. Hence, there is no intention by the disclosed examples of larger area tile to in any way limit the intended use thereof, or the use for which such tile are or may be found to be adapted.

All of the tiles of the examples whether of the preferred acoustic form or of the modified form have the common characteristic of having been injection molded into the form of a thin, flat sheet or plate of a thermoplastic material forming the body of the tile and having a thickness within the range of the order of five hundredths to ten hundredths of an inch (.05″ to .10″), that is to say approximately $\frac{1}{20}$″ to $\frac{1}{10}$″. In the particular examples of polystyrene tiles hereof, the bodies of both the preferred and the modified forms of tile have a maximum thickness of approximately six hundredths of an inch (.06″). Each of the example tile is formed with a continuous integral flange therearound which is comprised of an outwardly and rearwardly inclined wall or panel along each side of the tile and which terminates along its rear edge in a wall disposed normal to the plane of the front surface of the body of the tile, such rear wall of the flange having a straight, planar outer surface also normal to the plane of the tile body front surface or face. The inclined panel and inner or rear wall thereof along each side of the tile body are integrally joined at their opposite ends with the ends of the inclined panels and rear edge walls of the adjacent sides of the tile to form in effect the four corners of the tile unit. In the tile embodiments hereof the inclined panels and inner or rear edge walls making up the continuous flange of the tile are of uniform thickness throughout that is the same as the maximum thickness of the tile body, namely, six hundredths of an inch (.06"). The outer side, planar surface of the inner edge wall of the flange along each outer side of the tile body is located in a plane spaced a distance of ½" from the inner, forward edge of an inclined wall along which such wall joins the front side or face of the tile body. Hence, the square face of the tile body has plan dimensions of 11½" x 11½" and a resulting area of 132.25 square inches. However, the various features of the invention are not limited or restricted to any particular size of tile or surface area of the face thereof, but may be embodied in larger, sheet-like sizes, or in smaller sizes, including the so-called "wall tile" sizes.

In the preferred acoustical form of the tile illustrated in Figs. 1 through 9, the tile body is constituted by the thin, sheet-like plate 10 having a maximum thickness of approximately 0.06", and providing the flat, planar front surface or face 11, and the flat rear surface 12. The tile body has the continuous integral flange therearound comprised by the outwardly and rearwardly inclined panel or wall 14 and rear edge wall 15 thereof along each of the four side edges of the body 10. The rear wall 15 of each panel 14 is formed with a straight planar rear edge surface 15a which is adapted to form an elongated seat to abut and seat against the surface of a wall W or other structure as schematically indicated in Fig. 6 of the drawings. The inclined panel 14 and rear edge wall 15 along each side of body 10 are integrally joined at their opposite ends with the ends of the panels along adjacent sides to thereby form the beveled corners 14a of the tile unit. Thus, the rear edge walls 15 of the tile flange together form a hollow-square seating base for locating and positioning the tile in installed position on a structure to be acoustically treated. In the example tile, the rear edge surfaces 15a of the tile flange lie in a plane spaced approximately ¼" from the plane of the front surface or face 11 of the body of the tile, so that with the tile in installed position on a wall, the tile body is spaced outwardly from the surface of the wall a distance to provide a space S which is enclosed within the tile flange between the tile body and the wall (see Fig. 6). The outer side of each rear edge wall 15 of the continuous flange of the tile, is formed to provide a precisely planar surface 15b normal to the front surface or face 11 of the tile, for accurate abutment against the corresponding surface 15b of an adjacent tile in an installation of tile, so that a clean, visually satisfactory and mechanically tight joint between adjacent tile may be had with the joint so formed in effect providing a seal against the passage of foreign material therebetween.

The tile unit comprised of the body 10 and the continuous, integral flange 14—15 therearound is formed of an injection molded polystyrene in the example hereof, and, due to the physical and structural characteristics of injection molded polystyrene, the tile may be commercially produced with dimensional stability and dimensional precision. It is therefore possible with such thermoplastic to produce a tile of the form illustrated, with sharp, clear cut edges along and between the flange walls 14 and the front surface or face 11 of the tile and between such walls 14 and the rear edge forming walls 15 of the flange, with the inclined walls 14 being precisely planar and giving a clean, beveled appearance to the tile. And due to the characteristics of the material, the precision of the planar surfaces 15a and 15b may be attained by the injection molding of the tile, without requiring any machining, grinding, polishing or other finishing operations on the tile after the molding thereof.

The tile body 10 of the form of the tile of Figs. 1 through 9, is formed with a multiplicity of circular apertures, openings or holes 20 distributed over the entire area of the plate-like body 10 of the tile and opening through the front, exposed surface or face 11 thereof. The area of the front surface or face 11, in this example, is 132.25 square inches, and I have formed each circular aperture 20 of a diameter of 5/32" at the surface 11, and provided a total of 289 of such apertures of that particular diameter. These 289 apertures are arranged and located over the area of surface 11 of tile body 10, in seventeen parallel rows spaced equal distances apart across the surface 11 with each row being comprised of seventeen (17) apertures spaced equidistant apart along the row formed thereby. Hence, there results a pattern of apertures through the surface 11 in an equal distribution over the area thereof, which is comprised of seventeen (17) rows of seventeen (17) apertures each across the tile parallel with opposite edges thereof in one direction, and seventeen (17) rows of seventeen (17) apertures each across the tile in a direction perpendicular to the first mentioned rows. By thus arranging and distributing the apertures 20, each aperture of the 289 apertures is located with its center spaced 11/16" from the center of the apertures of the pattern next adjacent thereto in either direction along either row in which an aperture is located. In the example pattern arrangement the outermost row of apertures 20 along and parallel with each straight side edge 14b of the tile surface 11, has the apertures located with their centers spaced a distance of ¼" from such adjacent edge 14b.

With the tile thus apertured and comprised of the thin, plate-like body 10 and the flange 14—15, formed of an injection molded thermoplastic, such as a polystyrene, I have provided as an important feature of my invention, both acoustically and structurally, a multiplicity of vibratory, sound damping tubes 30 integral with the tile body 10 and projecting rearwardly from the rear side 12 thereof at each location of an aperture 20 through the body. Referring to Figs. 5, 8 and 9 in particular, each damping tube is formed of a wall 31 of cylindrical cross section and of a thickness less than the thickness of the tile body 10, say of an approximate order of 0.03". Each thin-walled damping tube 30 is molded as an integral part of the plate-like body 10, and is disposed in position projected rearwardly from the rear wall 12 of the body with its axis normal to the plane of the body face 12 and coincident with the center of an aperture 20 through the body. Each tube provides a bore or cylindrical passage 32 therethrough having the same diameter as the diameter of an aperture 20, namely 5/32" in this instance, so that the aperture 20 at which a tube is located provides the sound wave inlet opening through the body 10 from the front exposed face 11 thereof into the passage 32 of the tube. The length of each tube 30 is less than the distance between the outer surface or face 11 of the tile body 10 and the plane passing through the rear, seating edges 15a of the tile flange 14—15, that is to say, less than the distance between body 10 and the front surface of a wall W (see Figs. 4 and 6) with the tile in installed position on the wall. Thus, the tubes 30 are free at their inner ends with a tile installed on a wall as a component of an acoustic treatment. The inner, free end of each of the vibratory damping tubes 30 is open to provide the sound wave discharge outlet or opening 32' from the tube. In this preferred form of tube, the passage 32 therethrough is of constant diameter and the end discharge opening has the same diameter as the passage and as the inlet aperture 20 in the tube body 10.

As a further feature of the preferred form of damping tube, and as a factor contributing to the vibratory response of the tube to sound waves entering into and passing through the passage 32 of the tube, I have provided a construction at the base of each tube where the tube integrally joins with the body 10, by which the tube base is of reduced thickness relative to the thickness of the body 10. I have in the preferred expression of such a reduced depth for the base of a tube 30, referring now to the enlarged detail view of Fig. 9 in connection with Fig. 5, provided an annular recess 33 in the rear side 12 of the tile body 10 around each damping tube 30, with each recess being tapered or inclined radially outwardly from and around the inner or base end of the tube to the rear surface 12 of body 10. A recess 33 thus has its greatest depth at and around the outer surface of the thin wall 31 at the inner end of the tube at the line of integral jointure of the inner end of the tube with body 10. By this construction the thickness of body 10 is reduced around the aperture 20 which forms the inlet end of the tube to provide a reduced thickness mounting base 34 which integrally joins the tube with the tile body, as will be clear by reference to Fig. 9. The forward wall 33d of the recess 33 may be flat to form a radially outwardly and rearwardly sloping planar surface, or may be formed concave or even convex while retaining the essential function of reducing the thickness of the body around and immediately adjacent the inner end of a tube 30 and the aperture 20 thereof, to provide a base portion 34 having a more sensitive vibratory response.

The damping tubes 30 of Figs. 1 through 9, of lengths less than the distance between the outer face of the tile body and the plane of the rear edges of the edge flange are not specifically claimed herein but are disclosed and claimed in my copending application filed April 4, 1956, as a division of this application.

With the tile unit of this vibratory tube form secured in mounted position installed on and over a wall surface, such as the surface W as indicated in Fig. 4 of the drawings, the tile is positioned by the flange rear edge surfaces 15a seated against the wall surface with the multiplicity of tubes 30 projecting rearwardly from the rear side 12 of the tile body 10, into the space enclosed within the tiles. As the tubes 30 have a length less than the depth of the space S, the rear ends of the tubes are positioned spaced from and out of contact with the wall W, and are thus free to vibrate without interference with or constraint by either the tile or the wall structure. The polystyrene thermoplastic of which the tile is preferably formed, has when injection molded the characteristics of density and of surface hardness, and may be considered to be non-absorptive of sound waves striking against the hard front surface or exposed face 11 of the body 10 of the tile. However, with the great multiplicity of apertures 20 evenly distributed in a relatively closely spaced relationship over the entire area of face 11, a substantial percentage of the sound waves striking against surface 11 will enter into and be absorbed by these apertures, so that the striking waves will be effectively broken up as well as absorbed in the apertures with a resulting initial sound wave deadening effect. The effectiveness of the tile acoustically is substantially increased by the entry of the percentage of waves into the apertures 20 and the passage thereof through the tubes 30 and discharge from the inner ends of the tubes into the space S at the rear of the tile. Passage of sound waves into and through tubes 30 induces or sets-up vibration of the tubes, so that the sound energy is substantially expended and dissipated in effecting such vibration of tubes. In this manner a sufficient proportion or percentage of sound waves striking the tile body will be dissipated and destroyed to effect a substantial sound absorption with a minimum of reflected or induced waves being thrown back or projected from the tile body 10, notwithstanding the fact the tile body is formed of a substantially non-absorptive material having a relatively high inherent resonance response characteristic when in the thin plate form, of the body 10. Any sound waves which are not effectively damped out and expended in effecting vibrations of the tubes 30, or any of them, will be discharged from the free inner ends of the tubes into the space S at the rear side of the tile and there dissipated and absorbed within such space.

Due to the material of which the tile is formed having a relatively high resonance response, particularly when in the very thin, large area plate form of the tile of the example hereof, all portions of the body 10 may tend when sound waves strike the body to vibrate at the same frequency and thus reinforce and amplify the striking waves. I have determined that this characteristic may be effectively neutralized or substantially prevented to eliminate or reduce the undesirable effects acoustically on the sound absorbing efficiency of the tile, by forming the tile body with portions thereof of different thicknesses. The portions of the tile body which are of different thicknesses tend to vibrate at different frequencies in response to sound waves striking there against, with the result that the sound waves are diminished and tend to be damped out or absorbed by interference between the different frequencies of vibration, so that the amplification and projection of sound waves back from the tile may be substantially reduced.

In the tile of the example I have expressed this feature of my invention by forming the tile body 10 with four (4) locations thereon of minimum reduced thickness relative to the thickness of the surrounding adjacent portions of the tile. Referring to Fig. 3 of the drawings, at the central location on each quarter section of the rear side 12 of the tile body, the thickness of the body is reduced by the removal of material or the formation of a depression or low "spot" thereon. These tile body depressions or reduced wall thickness locations on the body are indicated in Fig. 3 as, a, b, c and d. From each such location the thickness of the body 10 progressively increases radially therefrom and therearound throughout the quarter-section area of which the minimum thickness location forms a center, to the portions of maximum tile wall thickness along the portions of the tile body which define the borders of the quarter-section. Each quarter section is bounded on two of its sides by the adjacent outer edges 14b of the tile body and on the two opposite, inner sides by portions of the body of maximum thickness along the median lines e and f schematically indicated in Fig. 3. In order to also indicate schematically the radial direction of progressive decrease in the depth of the depression, that is the increase in wall thickness, from and around each of the central, low or minimum wall thickness locations a, b, c and d in each quarter section of body area, I have applied lines g extending radially outwardly from the minimum wall thickness location to the boundaries of the quarter section, as will be clear by reference to Fig. 3.

In the example tile, the thickness of the wall of body 10 at each of the locations a, b, c and d, is 0.055", and the maximum thickness of the wall is 0.06", so that there is a difference in thickness of 0.005" between a minimum thickness location at each quarter section of body area and the maximum thickness portions of the body which define the borders of the section. The progressive increase in wall thickness radially outwardly from and around the minimum thickness central location is clearly shown in the sectional view of Fig. 7, taken through the quarter section of Fig. 5, in which the location a of minimum thickness appears, with the radially outwardly inclined surfaces 18 of the rear wall 12 extending to the maximum thickness borders of the section.

In order to buttress the acoustic tile of the form of the preferred example, and to provide additional, rigid seats against which the tile may be firmly attached in installed position, I have provided a plurality of integral, cylindrical bosses 40 located at strategic positions on and projecting rearwardly from the rear side 12 of the tile body 10. Referring to Fig. 8 in particular, each of these bosses has a flat, planar seating surface 41 across the rear side or end thereof which lies in the plane passing through the continuous seating edge 15a provided by the rear edge of the tile flange 14—15. In the arrangement of this example such bosses 40 are distributed and located as follows: one at each corner of the rear side 12 of the tile body; one midway along each edge of the tile body; one at the center of the rear side of the body; and one at the center of each quarter section of the tile rear surface, in this instance at each of the locations *a*, *b*, *c* and *d*, of minimum thickness of the tile body. Thus, with the relatively large area of the very thin tile body 10, when the tile is attached in installed position on a wall, the rear ends 41 of the bosses 40 are engaged against the surface of the wall and support the tile body 10 against bending or flexing inwardly toward the wall to thereby maintain the front side or face 11 of the tile body as a substantially true, flat, planar surface. Obviously any other suitable or desired arrangement of locations may be utilized for the bosses 40, and any number thereof may be used, as my invention is in no sense limited to the number or arrangement of the bosses provided on the example tile.

As the tile of the example form of Figs. 1 through 9, is of the type to be secured in installed position on a wall by mechanical fastening means, such as nails, I have devised a design and location of the bosses 40 by which they provide the members for nailing attachment to a wall or other structure and by which they utilize apertures 20 of the tile body for receiving the nails to be driven therethrough. For example, each boss is of tubular form and is formed on the rear side 12 of the tile in position with the bore 42 of the boss axially alined with an aperture 20 which aperture thus provides the front, nail receiving opening of the boss. The rear end of each nail receiving boss 40 is formed with the end wall 43 which provides across its outer side the seating surface 41, as referred to hereinabove. This rear end wall 43 is formed with an axial bore or opening 44 therethrough in axial alignment with the bore 42 and the aperture 20 through the face of the tile body, with the opening 44 having a diameter less than the diameter of bore 42. There is thus formed an annular seat 44*a* around the opening 44 within the boss 40 against which the head of a nail is driven and seated. In this manner a countersunk nailing opening through the tile body and each integral boss 40, is provided as clearly shown in Fig. 8 in particular, so that, the tile may be nailed into attached, installed position by driving the nails through the boss bores 42 and rear nail openings 44 into tile securing position with the nail heads engaged against the seats 44*a* in position "countersunk" within the bosses.

With the preferred form of the tile of Figs. 1 through 9, having the plan dimensions and the thickness for the tile body 10 as heretofore stated, the ratio of the aggregate area of all of the 289 apertures 20 each having a diameter of 5/32", to the total surface area of 132.25 square inches of the tile face 11, is considered to be effective in sound absorption or deadening. However, this ratio may be varied not only in the size tile of the example but in tiles of different face areas, although it is considered that the ratio may be effectively used for resulting acoustical efficiency with tiles of both smaller or larger sizes and face areas. But such ratio of aggregate sound opening area to tile face surface may be varied in accordance with the acoustic treatment desired.

The construction of the base 34, through the medium of the recess 33 at the inner end of a thin-walled damping tube may be varied to the construction of Fig. 10, in which a recess 33' of greater area and flatter slope to the wall formed thereby is provided. By the construction of Fig. 10, a reduced thickness base 34' is formed for a tube 30 than the base 34, to form in effect a relatively thin base disc for and with which a tube is integrally joined.

And while constructions of the base of the vibratory tube as shown in Figs. 9 and 10, offer certain advantages in vibration sensitivity and response for a tube, a construction such as shown in Fig. 11 may be employed with effective results with a tile of the form of Fig. 1. With the construction of Fig. 11, the recesses, such as 33 or 33' at the rear side 12 of the tile body 10 are eliminated, and substantially the full thickness of the tile body is maintained to and integrally joins with a tube 30. Such construction makes for a stiffer and more rigid tube base but still retains the free end, vibration responsive, thin-walled tube for effective sound wave damping.

The modified constructions of the bases of the tubes of my invention shown in Figs. 10 and 11 are not specifically claimed herein but are disclosed and claimed in my copending application filed April 4, 1956, as a division of this parent application.

In Figs. 12, 13 and 14, I have shown a variation of the damping tube wall construction for tubes having the types of bases of Figs. 9, 10 and 11, respectively. In the illustrated variation the damping tube 30A has in each instance a wall of slightly greater thickness than the very thin wall 31 of a tube 30, with the bore through the tube being of constant diameter but with the outer surface 36 of the tube wall being progressively tapered inwardly from the base to the rear, free end of the tube. There is thus provided a damping tube having a wall thickness which progressively decreases from base to the rear, free end thereof.

A further variation of the damping tube is disclosed in Figs. 15, 16 and 17, by a tube 30B having a thin wall 37 of approximately the thickness of the wall 31 of a tube 30, but with the wall 37 of uniform thickness throughout its length and being progressively tapering from the base to the rear, free end of the tube. Such form of tube provides the bore therethrough as being of progressively decreasing diameter from the base to the free rear end of the tube. The tube 30B is shown in Figs. 15, 16 and 17 as having bases of the types shown for the tube 30 in Figs. 9, 10 and 11, respectively.

If desired or found expedient the damping tubes of any of the forms and constructions may be provided with the rear free ends thereof closed by an end wall formed integral with the tube side wall. As an example I have illustrated such a closed end tube 30C in Figs. 21, 22 and 23 as applied to the tube of the form shown in Figs. 12, 13 and 14. A tube of the form of tube 30C has a flat end wall 38 molded integrally with the tube to extend completely across and close the rear end of the tube. The tubes 30C of Figs. 21, 22 and 23, are shown integrally joined with the tile body 10, by bases of the types shown in Figs. 9, 10 and 11, respectively. While the closing of the rear free ends of the damping tubes may decrease the acoustic efficiency thereof and of a tile on which used, yet the closed chambers thereby formed having the sound inlet apertures 20 through the face of the tile body will have a substantial sound wave absorbing effect, particularly with a distribution of such tubes with the sound absorbing chambers therewithin, in great multiplicity over the face of the tile body in an arrangement such as shown in Figs. 1 and 3 of the drawings.

The damping tube constructions of Figs. 12, 13, 14, 15, 16, 17, 21, 22 and 23 are not specifically claimed herein but are disclosed and claimed in my aforesaid copending application filed April 4, 1956, as a division of this parent application.

In Figs. 18 and 19, tubes 30D of the forms and base constructions of Figs. 12 and 13, respectively, are shown in a variation in which the length of the tube is extended to position the rear edge at the open end thereof in the plane which passes through the planar seating edges 15*a* of the rear wall 15 of the tile flange. Such an extended tube may, if desired, be provided with the joining base construction as shown in Fig. 14. Similarly, tubes of the forms of Figs. 9 through 11, and 15 through 17, may be provided of such extended length if found expedient for and particular purpose or installation.

A thermoplastic tile of my invention in accordance with a modified form thereof illustrated in Figs. 27 through 32, may eliminate the damping tubes of the forms of Figs. 1 through 9 and the several disclosed variations thereof, and provide the tile body 10' as solely a thin plate having only the mounting and nailing bosses 40 provided in any desired arrangement on the rear side thereof. In Fig. 27, a quarter section of the front side of such a tile is shown having a number and distribution of apertures 20' therethrough similar to that provided for the preferred form of tile of Fig. 1. The rear side 12' of the tile body 10' is formed with an annular rearwardly and outwardly tapered recess 33a therein surrounding and concentric with each aperture 20'. Each recess 33a extends into the body 10' of the tile to its face aperture 20' with the latter forming the smaller diameter sould wave inlet opening of a rearwardly tapering passage having its large diameter discharge opening through the rear surface 12' of the tile body.

This modified form of tile of Figs. 27 through 32, will without the damping tubes of the preferred form, give an effective performance acoustically for certain characters and conditions of installation. Due to the distribution and number of the apertures 20', which apertures may be taken to each be of the diameter of an aperture 20 of the preferred form, a substantial and effective percentage of the sound waves striking the face of the tile body 10' will enter and pass through the apertures 20' and the rearwardly tapering passages provided by the annular recesses 39, into the space at the rear of the tile. Such sound waves will thus be dissipated and absorbed, while the construction of the tile body with portions thereof of different thicknesses will as hereinbefore explained, further contribute to the dissipation of the striking sound waves and the reduction in amplification of and projection of sound waves back from the tile.

The modified form of tile of Figs. 27 to 32, lends itself to the mounting of sound absorbing material in the space at the rear of the tile, where in any installation it may be found desirable to do so.

Instead of providing the recesses 33a as of a progressive taper to the front surface or face 11' to form and define each aperture 20' by a short, thin circular edge, as in the example illustrated, the aperture may be formed of greater depth by a constant diameter passage which joins and opens into the recess at an intermediate location within the tile body.

The modified form of tile shown in Figs. 27 through 32 hereof is not claimed herein in its specific form but is disclosed and claimed in my aforesaid copending application filed April 4, 1956, as a division of this parent application.

The preferred form of the tile of Fig. 1 and the modified form of Fig. 27, are both shown as being of the nail attachment type, but by a further feature of my invention I have provided a form of the tile having the multiplicity of sound wave receiving tubes so designed as to render the tile capable of efficient installation by means of a mastic and without the necessity of mechanical fastening means. In its simpler form, referring now to Figs. 21, 22 and 23, in connection with Fig. 20, I extend the tubes, or a number thereof, in the closed end form as typified by Figs. 21 through 23, a distance to place the rear surface of the end closing wall in the plane of the planar rear edges 15a of the tile flange 14—15. For example, such an extended, closed end tube 50 is shown in Fig. 20 having the end closing wall 51 presenting the rear surface 52 thereof in the plane of flange edges 15a. Thus, a mastic coating in unset, plastic condition may be applied to a wall surface in the usual manner familiar in the art, and tiles having extended, closed end tubes to the desired number, may then be pressed onto the mastic coating with the inner closed ends of the tubes engaged in the mastic. When the mastic sets the tile of this form is then securely keyed in installed position by the closed ends of the tubes.

In order to increase the holding effect of the closed end tubes when engaged in the still unset plastic, I have devised a form and construction by which a suction cup is provided at the rear closed end of the tube. Referring to Figs. 24 and 25, I mold the tile with the closed end tubes 50 thereof provided with a rearwardly extended flange or skirt 53 therearound in combination of the tube wall. Thus, flange 53 provides at the rear end of the tube a cup 54 which is closed at its inner or bottom side by wall 52 and at its outer side by flange 53, with its rear side open. In one form of such tube and suction cup as exemplified by Fig. 24, I may make the overall length of the tube 50 and flange 53 such that the rear edge of the flange lies in the plane of the rear edges 15a of the tile flange. With such form the closing wall 51 is located in a position spaced forwardly in the tube from the position of such wall as shown in Fig. 20.

In another form of such tube and suction cup as shown in Fig. 25, I form the flange 55 as of greater length than the flange 53 of Fig. 24, and then bend or form the flange to flare or extend radially outwardly from and around the tube to thereby provide a key or anchor for engagement in the mastic. With the form of Fig. 25, the suction cup 54 will function primarily to hold the tile in position while the mastic is setting. After the mastic is set the key or anchor flange 55 then firmly and rigidly holds the tile in installed position. I may curl or press the flange 55 into final form by molding it straight as indicated in Fig. 25, and then pressing or forcing the flange against a hot plate to soften the thermoplastic and cause the flange to be pressed outwardly into its radially flared, anchor forming shape.

The forms of tubes of Figs. 24 and 25 hereof are not claimed herein but are disclosed and claimed in my aforesaid copending application filed April 4, 1956, as a division of this parent application.

With any of the closed end forms of the tubes, I may provide sound wave discharge openings in the side wall of the tube. As an example, referring to Figs. 20 and 26, a tube such as 50 may be provided with diametrically opposite, relatively wide, rectangular openings 60 through the side wall of the tube. These openings 60 may, as in the selected example, have a length substantially coextensive with the length of the tube between the rear surface 12 of the tile body and the end closing wall 51. These openings 60 may be of such a width as leave relatively narrow frame forming members 61 at opposite sides of the structure, as will be clear by reference to Fig. 26. Such side members 61 may be of centrally thickened form along their length and of decreased thickness along opposite edge portions thereof to give the requisite strength to such relatively narrow members.

By the construction of Figs. 20 and 26, the acoustic efficiency of the tile of the closed end tube, mastic installed type may be improved, as the sound waves entering an aperture 20 may then pass out through the openings 60 and be dissipated and absorbed in the space at the rear of the tile. Further, it is to be noted that by the construction shown for the form of Figs. 20 and 26, the rear wall 51 of the tube structure may be pressed into the mastic in installing the tile with the inset mastic flowing or being displaced over the wall 51, or the portions thereof at openings 60, so that when the mastic sets the tile is firmly keyed thereto.

The side wall openings, such as openings 60, may be reduced in dimensions to thereby reduce the area of the opening, and instead of being of rectangular shape as in the example, they may be formed of any desired plan form. Where the tile is of the nail attachment type and provided with the closed end tube forms of Figs. 21 through 23, side openings may be provided of shorter length and need not extend to an end closing wall where such wall is not intended to function as a key embedded in a mastic coating.

My invention contemplates and includes tiles which are provided with the majority of the damping tubes having open, sound wave discharging rear ends, such as the tube forms of Figs. 9 through 17, together with a sufficient number of closed end tubes, with or without end suction cups, such as shown in Figs. 24 or 25, for anchoring or keying in a mastic to permit of the mastic installation of the tile. Or as the mastic embedded tubes such a tile may be provided with the open side tube form of Fig. 20.

The invention provides as a new article of manufacture an acoustic tile in several forms and types, injection molded of a thermoplastic material, such for example as a polystyrene and the designs and constructions of such tile as to certain of the essential features thereof utilize certain of the physical characteristics of an injection molded thermoplastic material to attain increased acoustical and structural efficiency, and to make it possible to produce a complete tile structurally and in finished form by a single injection molding cycle with standard injection molding equipment. However, the invention is capable of expression in other thermoplastic materials than a polystyrene, and as to certain features thereof in other materials than thermoplastics. Hence, it is not intended to restrict the invention and the several features thereof to use only in a polystyrene tile. Similarly while the thermoplastic material tile may be preferably formed by injection molding, it is not intended to so restrict the invention as it includes the formation of the tile by other molding methods.

It will also be evident that various other modifications, embodiments, combinations, substitutions, eliminations, as well as various composite arrangements of the several forms and variations shown, might be resorted to without departing from the broad spirit and scope of my invention, and hence I do not desire to limit the invention in all respects to the exact and specific disclosures of the several examples hereof, except by intended specific limitation thereto appearing in any of the claims hereto appended.

What I claim is:

1. An acoustic tile formed of a dense, hard-surfaced material, said tile being comprised of a thin, plate-like and resonance-responsive body; means associated with said tile for positioning said resonance-responsive body generally parallel with but spaced from a surface to be acoustically treated in the installed position of said tile; said thin body being formed of minimum thickness at relatively widely spaced apart points thereon and being formed of maximum thickness along relatively narrow areas surrounding and spaced from each of said points of minimum thickness and intermediate such point and the other of said points of minimum thickness adjacent thereto; and said tile body across the area thereof between each of said points of minimum thickness and the relatively narrow surrounding areas of maximum thickness adjacent thereto being formed of progressively increasing thickness from and around each such point of minimum thickness to the said surrounding adjacent areas of maximum thickness.

2. An acoustic tile comprising a thin, plate-like resonance-responsive body adapted to be installed in position generally parallel with but spaced from a surface to be acoustically treated in resonance-responsive suspension thereover; said body being formed at relatively widely but approximately equally spaced apart points thereon of minimum thickness and being formed of maximum thickness along relatively narrow areas thereof spaced from and surrounding and being located approximately midway between each such point of minimum thickness and the other of said points of minimum thickness adjacent thereto; said tile body between each of said points of minimum thickness and the relatively narrow areas of maximum thickness spaced from and surrounding such point of minimum thickness being formed of progressively increasing thickness from and around said point of minimum thickness to said adjacent surrounding areas of maximum thickness; and the said tile body being formed with a multiplicity of relatively closely spaced apertures therethrough over substantially the entire area thereof including said areas of the tile body of different thicknesses for passage of sound waves therethrough to the space at the rear of said tile body.

3. An acoustic tile comprising a thin, plate-like resonance-responsive body having a rearwardly extending edge flange therearound, said tile being adapted to be installed in position by said edge flange with said thin plate-like body disposed generally parallel with but spaced from a surface to be acoustically treated in resonance-responsive suspension thereover; said body being formed of spaced local areas of minimum thickness and local areas of maximum thickness spaced from and around said areas of minimum thickness, respectviely; said tile body between each of said areas of minimum thickness and said areas of maximum thickness adjacent thereto being formed of increasing thickness from and around each of said local areas of minimum thickness to those local areas of maximum thickness adjacent thereto; and said tile body being formed with a multiplicity of apertures therethrough spaced apart over substantially the entire area thereof including areas of varying thicknesses of said tile body for passage of sound waves therethrough to the space at the rear of the tile body.

4. An acoustic tile comprising a thin, plate-like body adapted to be installed in position generally parallel with but spaced from a surface to be acoustically treated; said tile body being formed over the total area thereof with spaced apart local areas of minimum thickness and local areas of maximum thickness spaced therefrom; said tile body over the major areas thereof between such local areas of minimum thickness and local areas of maximum thickness being formed to progressively vary in thickness from each said local area of minimum thickness to said local areas of maximum thickness adjacent thereto; and said tile body being provided with a multiplicity of apertures therethrough spaced apart over substantially the total area thereof and extending through those areas of the tile body of different thicknesses for passage of sound waves therethrough to the space between the rear side of said tile body and the surface to be acoustically treated.

5. As a new article of manufacture, an acoustic tile formed of plastic material and comprising, a thin, plate-like body having a rearwardly extending edge flange therearound, the front side of said body being formed to provide a flat, planar face surface, the rear side of said body being formed to provide depressed local areas of minimum body thickness spaced apart thereon and elevated local areas of maximum body thickness spaced from and around each of said depressed local areas; and the surrounding areas of said tile body between said local areas of maximum thickness and said local areas of minimum thickness being formed by rearwardly inclined surfaces to form such portions of the total area of the tile body of progressively decreasing thickness from said areas of maximum thickness to said areas of minimum thickness, respectively.

6. An acoustic tile comprising a thin, plate-like body formed of plastic material and being adapted to be installed in position generally parallel with but spaced from the surface to be acoustically treated; said tile body being formed over the total area thereof with spaced local areas of minimum thickness and local areas of maximum thickness spaced from and around each local area of minimum thickness; the major areas of the tile body located between such local areas of minimum thickness and said local areas of maximum thickness being formed to vary in thickness from each of said local areas of minimum thickness to the said local areas of maximum thickness adjacent thereto; said tile body being provided with a multiplicity of relatively closely spaced apertures therethrough substantially over the entire area thereof, including areas of the tile body of different thicknesses; damping tubes integral with said body and extending rearwardly from the rear side thereof; and each of said damping tubes being located on said tile body in position with one of said apertures aligned with and providing the forward inlet opening of the tube through said tile body.

7. An acoustic tile formed of plastic material and comprised of a thin, plate-like body having a rearwardly extending edge flange therearound, said tile being adapted to be installed with said thin tile body positioned generally parallel with but spaced from the surface to be acoustically treated; said tile body being formed over the total area thereof with spaced local areas of minimum body thickness and local areas of maximum body thickness spaced from and around each of said local areas of minimum thickness; the major areas of said tile body located between said local areas of minimum thickness and said local areas of maximum thickness being formed to vary in body thickness from each of said local areas of minimum thickness to the said local areas of maximum thickness adjacent thereto; said tile body being provided with a multiplicity of relatively closely spaced apertures therethrough over substantially the total area thereof; damping tubes integral with said body and extending rearwardly from the rear side thereof; each of said damping tubes having a passage therein opening therethrough at the rear side of said tile body; and each of said damping tubes being located on said tile body in position with one of said tile body apertures opening into said passage in the tube.

8. An all-plastic acoustic tile for mastic installation, said tile being formed of a molded plastic material and comprising a plate-like body having the front side thereof formed to provide a flat, planar face area; a plurality of tubular members molded integrally with and being positioned on and projecting rearwardly from the rear side of said tile body; a rearwardly extending edge flange around and integral with said tile body; said tubular members being closed at the rear ends thereof and open at the forward ends through said body and the front face thereof; the rear closed ends of said tubular members being located in a plane passing through the rear edges of said body flange; and said tubular members having diametrically opposite side wall openings therethrough of a length substantially equal to the length of a member between the rear side of said tile body and the closed rear end of the member.

9. A plastic acoustic tile formed of a molded plastic material and comprising a relatively thin plate-like body having the front side thereof formed to provide a face area thereover; a plurality of plastic sound wave damping tubes molded integrally with and being positioned spaced over and projecting rearwardly from the rear side of said tile body; a rearwardly extending edge flange around and integral with said tile body; said plastic tubes being open at the forward ends thereof through said body and the front face thereof forming sound wave receiving apertures therein spaced apart over said front face; and said plastic tubes having opposite side wall openings therethrough extending for substantially the length of a tube between the rear side of said tile body and the rear end of the tube.

10. An acoustic tile in accordance with claim 9 in which said plastic sound wave damping tubes have the rear ends thereof located in a plane passing through the rear edges of said edge flange of the tile body.

11. An all-plastic acoustic tile formed of a molded plastic material and comprising a relatively thin, plate-like body having the front side thereof formed to provide a face area thereover; a plurality of sound wave damping tubes integrally molded with and being positioned spaced apart on and projecting rearwardly from the rear side of said tile body; a rearwardly extending edge flange around and integral with said tile body; said tubes being closed at the rear ends thereof and being open at the forward ends through said body and the front face thereof for receiving sound waves thereinto; said rear closed ends of said sound wave damping tubes being located in a plane passing through the rear edges of said body edge flange; and said sound wave damping tubes being formed with openings through the side walls thereof.

12. An acoustic tile formed of molded plastic material and comprising a relatively thin, plate-like body having the front side thereof formed to provide a face area thereover; a plurality of plastic material sound wave damping tubes molded integrally with said tile body and being positioned on and extending rearwardly from the rear side thereof in relatively closely spaced relation over the area thereof; said plastic damping tubes being of small external and internal diameters relative to the plan dimensions of said tile body; said damping tubes being open at their forward ends through said body and the front face thereof to form relatively small diameter sound wave receiving apertures through said front face in relatively closely spaced arrangement over substantially the entire area thereof; and said plastic damping tubes also having side wall openings therethrough for sound wave discharge therefrom to the space therebetween at the rear side of said tile body.

References Cited in the file of this patent

UNITED STATES PATENTS

| | | |
|---|---|---|
| 254,269 | Brown | Feb. 28, 1882 |
| 903,300 | Marvick | Nov. 10, 1908 |
| 915,570 | Dryden | Mar. 16, 1909 |
| 1,554,179 | Trader | Sept. 15, 1925 |
| 1,804,884 | Mazer | May 12, 1931 |
| 1,864,153 | Solon | June 21, 1932 |
| 1,937,889 | Howard | Dec. 5, 1933 |
| 1,961,374 | Mazer | June 5, 1934 |
| 2,014,749 | Smith | Sept. 17, 1935 |
| 2,077,713 | Ross et al. | Apr. 20, 1937 |
| 2,186,684 | Ritter | Jan. 9, 1940 |
| 2,242,834 | Price | May 20, 1941 |
| 2,280,631 | Coffey | Apr. 21, 1942 |
| 2,337,525 | Peik | Dec. 21, 1943 |
| 2,412,713 | Burt | Dec. 17, 1946 |
| 2,486,756 | Murphy et al. | Nov. 1, 1949 |
| 2,541,159 | Geiger | Feb. 13, 1951 |
| 2,567,070 | Hjartsater | Sept. 4, 1951 |